United States Patent Office 3,038,923
Patented June 12, 1962

3,038,923
METHOD FOR OXIDIZING DIOLEFIN DRYING OILS
Neville Leverne Cull, Baker, and Paul Thomas Parker, Baton Rouge, La., assignors to Esso Research and Engineering Company, a corporation of Delaware
No Drawing. Filed June 30, 1958, Ser. No. 745,245
6 Claims. (Cl. 260—451)

This invention relates to a method of oxidizing polymers of a conjugated diolefin and copolymers thereof with other monomers. More specifically, it relates to an improved method for the oxidizing of such polymers in the presence of a paraffin hydrocarbon solvent.

It is known that the film-forming properties of liquid polymers of conjugated diolefins such as butadiene or copolymers of butadiene and styrene can be remarkably improved by the treatment of these polymers with air or oxygen at elevated temperatures in the presence of catalysts. The treatment is best conducted by blowing the polymer while dissolved in a suitable solvent with air or oxygen at temperatures between 70° and 300° F. The solvents found useful include paraffin hydrocarbons, aromatic hydrocarbons and their mixtures as well as various oxygenated solvents such as alcohols, ketones, ethers and the like.

It has been considered preferable to use aromatic solvents, either pure hydrocarbons or mixtures of paraffin and aromatic hydrocarbons having a Kauri Butanol value of about 40 and above because as oxygen is absorbed by the polymer oil there is a tendency for the oxidized polymer to precipitate from solution and to gel upon standing or heating. Aromatic hydrocarbons, however, are subject to peroxide formation and the presence of these compounds in the mixture may present an explosion hazard. For that reason attempts have been made to use more paraffinic solvents which are not so prone to peroxide formation, particularly the normal paraffins. Yet, as pointed out above, the oxidized polymer is less soluble in the paraffin hydrocarbons and difficulties are encountered in preventing precipitation and gelling.

In accordance with the present invention, it has now been found that paraffinic solvents can be used and the oxidized polymer kept from gelling by carrying out the oxidation at a temperature between 200° and 260° F. and after completion of the reaction replacing the paraffinic solvent with a solvent in which the oxidized polymer is soluble at room temperature. This can be accomplished by adding an aromatic hydrocarbon or an oxygenated solvent to the oxidized mixture prior to cooling. This will prevent precipitation and gelling of the polymer upon cooling. An amount of solvent at least equal in weight to the polymer is sufficient. If the paraffin hydrocarbon used boils at a lower temperature than the added solvent, then it can be stripped off leaving the oxidized material dissolved in the aromatic or oxygenated solvent.

According to another embodiment of the invention the solution of oxidized polymer in paraffin hydrocarbon is cooled to precipitate the polymer. It is then washed free of the solvent used during the oxidation and immediately redissolved in an aromatic hydrocarbon or a hydrocarbon fraction containing sufficient aromatic hydrocarbons to have a Kauri Butanol value of at least 40. Instead of an aromatic hydrocarbon an oxygenated solvent may be used instead.

The synthetic polymer oils which may be oxidized in accordance with this invention include polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e.g., with 0 to 40% of styrene, styrenes having alkyl groups substituted on the ring such as para methyl styrene, dimethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Under proper conditions the emulsion polymerization technique may also be adapted to the preparation of drying oils to which the present invention is applicable. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150° and 200° C. (Varsol), 3 parts t-butyl hydroperoxide (60% pure), and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content with mineral spirits. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent No. 2,586,594 of Arundale et al. which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–100% non-volatile matter is obtained.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60° and 200° C., e.g., butane, benzene, xylene, naphtha, cyclohexane and the like. The diluents are usually used in amounts ranging from 50 to 500 parts per 100 parts of monomer. The reaction temperature may vary between about 40° C. and 100° C., preferably around 65° to 85° C. As a catalyst, 0.1 to 10 parts of dispersed metallic sodium is used per 100 parts of monomers, sodium particle sizes below 100 microns being particularly effective.

A particularly suitable process for the preparation of the polymer oil in accordance with this synthesis is the multi stage continuous process described and claimed in Serial No. 485,392, filed February 2, 1955, in the name of Stanley E. Jaros et al. The disclosures of this application are incorporated herein by reference.

The polymers produced by the above process have molecular weights up to 10,000 and viscosities up to 22 poises at 50% N.V.M. and are pale yellow to colorless liquids.

The above polymer oils are dissolved in a paraffin hydrocarbon solvent and oxidized by blowing air or oxygen into a tube or vertical tank containing the copolymer. If desired the oxidation can be carried out in a packed column under slight pressure in accordance with the techniques disclosed in Serial No. 665,571, filed June 13, 1957, in the names of Segraves and Hillard. When the batch process is used the air or oxygen is introduced through a porous thimble or distributing plate near the bottom of the tank so as to afford maximum introduction of oxygen into the polymer. The temperature is maintained at 70° to 300° F. and the blowing is continued from 1 hour up to four days or as long as necessary to incorporate the desired amount of oxygen in the polymer.

Paraffin hydrocarbons suitable for carrying out the blowing include the paraffin hydrocarbons having at least four carbon atoms in the molecule, e.g., butane, pentane, hexane, heptane, octane, nonane, decane, up to tetradecane or higher, or fractions containing them such as Varsol, a straight run mineral spirits, having an API gravity of 49.0, a flash point of 40° C., a boiling range of 150°–200° C. and a kauri butanol value of 33–37.

Upon completion of the oxidation, e.g., when the desired amount of oxygen has been added, the blown oil can be diluted with an aromatic solvent having a kauri butanol value above 40 and being capable of dissolving the oxidized polymer at room temperature. Such an aromatic solvent includes benzene, toluene, xylene or mixtures thereof. A suitable solvent is Solvesso 100 (a mixture of aromatic hydrocarbons boiling from about 150° to 175° C.), Solvesso 150 (a mixture of aromatic hydrocarbons boiling from about 190° to 210° C.) or mixtures thereof.

Instead of dissolving the oil in an aromatic hydrocarbon, oxygenated solvents such as ethanol, propanol, isopropanol, n-butanol, sec-butanol, isobutanol, hexanols, acetone, methylethylketone, dimethyl ether, methylethyl ether, diethyl ether, diisopropyl ether, dioxane, acetal, methylal, and the like may be used. In any case, the solvent should have a kauri butanol value of about 40 and all such solvents can be used.

In another embodiment of the invention the oxidized polymer may be precipitated from the paraffin solvent by cooling to room temperature or the oxidation may be carried out under pressure in the presence of a low boiling solvent such as butane or pentane. Upon completion of the blowing, the low boiling solvent may be flashed off. In either case, the polymer is washed, if necessary, from the paraffinic solvent and re-dissolved in the aromatic or oxygenated solvent. By operating according to either of these methods the oxidized polymer is prevented from gelling by replacing the paraffinic solvent with either the aromatic or oxygenated solvent or other solvent having a K.B. value of at least 40 before the polymer has had time to gel. Care should be taken not to heat the polymer after precipitation because heat hastens gelation.

The following examples are presented to illustrate typical applications and effects of the invention. All quantities are expressed in this specification and claims on a weight basis unless stated otherwise.

*Example 1*

A butadiene-styrene drying oil was prepared from the following charge:

| | Parts |
|---|---|
| Butadiene-1, 3 | 80 |
| Styrene | 20 |
| Varsol | 200 |
| Dioxane | 40 |
| Isopropanol | 0.2 |
| Sodium (10–50 micron dispersion) | 1.5 |

The polymerization of this charge was carried out at 50° C. with a mechanical agitator. Complete conversion was obtained in 4.5 hours. The catalyst was destroyed and removed from the resulting crude product and the product stripped to 98% N.V.M.

The oil thus obtained was dissolved in n-tetradecane, Solvesso 100, and n-heptane and each solution (35 wt. percent polymer) blown with air with the following results:

| Solvent | n-tetradecane | Solvesso | n-heptane |
|---|---|---|---|
| Catalyst | 0.01% Mn Naphthenate | | |
| Pressure | Atm. | Atm. | 150 p.s.i.g. |
| Temperature, °F | 240–250 | 240–245 | 230–240 |
| Gas | Oxygen | Oxygen | Air |
| Gas Rate/l/hr./gm | 0.032 | 0.032 | 0.227 |
| Peroxide No | 2260 | 3600 | 800 |

In each case the polymer remained in solution as long as the oxidation temperature was maintained. Upon cooling the polymer precipitated as a light yellow polymer. These experiments demonstrate that oxidized polymers can be obtained by air blowing in the presence of paraffinic solvents with the production of less peroxides than with aromatic hydrocarbons.

*Example 2*

150 grams of polymer prepared according to Example 1 having a non-volatile content of 98% was dissolved in 280 grams of n-decane and 0.7 gram of a 6% manganese naphthenate solution was added. The mixture was oxidized at 237°–244° F., for 134 minutes in a closed system with oxygen at atmospheric pressure under conditions of violent agitation. A total of 10 wt. percent oxygen (based on polymer) was absorbed. Upon cooling the mixture set to a waxy solid from which the solvent separated on standing. After nine days the product was only partially soluble in hot Solvesso 100 indicating that gelation had proceeded to a considerable extent.

*Example 3*

A mixture prepared as in Example 2 was oxidized with oxygen at 239°–247° F. for 93 minutes at atmospheric pressure. Ten wt. percent oxygen was absorbed. A portion of the product was diluted with 40 wt. percent xylene (based on solution) while still hot. No precipitation of resin occurred on cooling and the solution remained stable.

185 grams of the mixture was diluted with 400 cc.

n-hexane with stirring and cooled to room temperature. The precipitated material was washed a second time with 200 cc. of n-hexane. The washed product weighed 76 grams. This material was dissolved in 127.5 grams of acetone. The solution remained stable. A portion of the acetone solution was diluted with an amount of xylene equal in weight to the dissolved polymer and the acetone stripped off at reduced pressure. A stable light yellow solution resulted.

*Example 4*

A mixture of 130 grams of the polymer oil used in Example 1 was dissolved in 305 grams of n-octane and 0.6 gram of a 6% manganese naphthenate solution added. The mixture was oxidized by blowing with oxygen at atmospheric pressure in a closed system. The oxidation time was 170 minutes. Ten wt. percent oxygen was absorbed. A portion of the product was diluted with 33.5 wt. percent xylene. The material remained in solution and was stable after cooling to room temperature. The remainder of the product was precipitated with n-hexane and immediately dissolved in acetone at room temperature. The resulting solution was stable.

The above examples show that diolefin polymer oils can be oxidized by blowing with air or oxygen in a paraffin hydrocarbon solvent to form a stable solution of oxidized polymer as long as the solution remains at a temperature between 200° and 260° F. However, the polymer precipitates upon cooling and, if allowed to stand or is heated, gels very quickly. The examples show that this precipitation can be avoided by diluting with an aromatic hydrocarbon or oxygenated solvent. Alternatively the polymer can be precipitated from the paraffinic solvent provided it is immediately dissolved in the aromatic or oxygenated solvent.

The oxidized oils prepared according to this invention are particularly suitable as coating compositions either as a varnish or an enamel base. Depending on the type of pigment employed and eventual use contemplated, the concentration of pigment may be varied in various enamels within very broad ranges such as between 5 and 75% based on the weight of non-volatile polymeric constituents of the drying oil base. The oxidized oils can be modified further by mixing therewith other drying oils such as linseed oil, tung oil, soybean oil or other unsaturated vegetable oil.

The nature of the present invention having been thus fully set forth and specific examples of the same given, what is claimed as new and useful and desired to be secured by Letters Patent is:

1. A process for oxidizing liquid polymers of conjugated diolefins of 4 to 6 carbon atoms which comprises blowing the polymers with oxygen at a temperature of 200 to 260° F. in the presence of a paraffinic hydrocarbon solvent until the desired amount of oxygen is introduced into the polymer, then replacing the paraffinic solvent after completion of the oxidation with a solvent having a kauri butanol value of at least 40.

2. Process according to claim 1 in which the solvent having a kauri butanol value of at least 40 is chosen from the group consisting of aromatic hydrocarbons, alcohols, ketones, ethers and aldehydes.

3. A process for oxidizing liquid polymers of conjugated diolefins of 4 to 6 carbon atoms which comprises blowing the polymers with oxygen at a temperature of 200 to 260° F. in the presence of a paraffinic hydrocarbon solvent until the desired amount of oxygen is introduced into the polymer, then diluting the resulting solution of oxidized polymer in paraffin hydrocarbon solvent with at least an equal weight, based on polymer, of a solvent having a kauri butanol value of at least 40 to prevent precipitation of the polymer upon cooling to room temperature.

4. A process for oxidizing liquid polymers of conjugated diolefins of 4 to 6 carbon atoms which comprises blowing the polymers with oxygen at a temperature of 200 to 260° F. in the presence of a paraffinic hydrocarbon solvent until the desired amount of oxygen is introduced into the polymer, then cooling the resulting solution of oxidized polymer to precipitate the polymer, washing the precipitated polymer to separate the paraffinic solvent from the polymer and immediately redissolving the precipitated polymer in a solvent having a kauri butanol value of at least 40.

5. A process for oxidizing liquid polymers of conjugated diolefins of 4 to 6 carbon atoms which comprises blowing the polymer with oxygen at a temperature of 200 to 260° F. in the presence of a normally gaseous hydrocarbon and under a sufficient pressure to maintain the normally gaseous hydrocarbon in the liquid state, releasing the pressure upon completion of the oxidation to precipitate the polymer and redissolving the precipitated polymer in a solvent having a kauri butanol value of at least 40.

6. Process according to claim 1 in which the liquid polymer is a copolymer of butadiene and styrene.

References Cited in the file of this patent

UNITED STATES PATENTS

| | | |
|---|---|---|
| 2,122,826 | Van Peski | July 5, 1938 |
| 2,580,184 | Murray | Dec. 25, 1951 |
| 2,762,790 | Greene | Sept. 11, 1956 |
| 2,826,618 | Gleason | Mar. 11, 1958 |
| 2,895,979 | Segraves et al. | July 21, 1959 |